United States Patent
Driever et al.

(10) Patent No.: US 9,641,455 B2
(45) Date of Patent: May 2, 2017

(54) MECHANISM FOR TERMINATING RELAY OPERATIONS IN A DISTRIBUTED SWITCH WITH CASCADED CONFIGURATION

(71) Applicant: International Business Machines Corporation, Armonk, NY (US)

(72) Inventors: Patricia G. Driever, Poughkeepsie, NY (US); Roger G. Hathorn, Tucson, AZ (US); Henry J. May, Cedar Falls, IA (US); Christoph Raisch, Gerlingen (DE); Daniel Sentler, Steinenbronn (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 225 days.

(21) Appl. No.: 13/945,125

(22) Filed: Jul. 18, 2013

(65) Prior Publication Data

US 2015/0023364 A1    Jan. 22, 2015

(51) Int. Cl.
*H04L 12/26* (2006.01)
*H04L 12/933* (2013.01)
*H04L 12/931* (2013.01)
*H04L 12/939* (2013.01)

(52) U.S. Cl.
CPC ............ *H04L 49/15* (2013.01); *H04L 49/357* (2013.01); *H04L 49/557* (2013.01)

(58) Field of Classification Search
None
See application file for complete search history.

(56) References Cited

U.S. PATENT DOCUMENTS

| | | | |
|---|---|---|---|
| 6,816,917 B2 | 11/2004 | Dicorpo et al. | |
| 7,233,569 B1* | 6/2007 | Swallow | H04L 12/4633 370/225 |
| 7,441,154 B2 | 10/2008 | Klotz et al. | |
| 7,447,198 B1* | 11/2008 | Banks | H04L 45/00 370/327 |
| 7,593,324 B2* | 9/2009 | Jain et al. | 370/227 |

(Continued)

FOREIGN PATENT DOCUMENTS

| | | |
|---|---|---|
| EP | 1986371 | 10/2008 |
| JP | 2002368770 | 12/2002 |

(Continued)

OTHER PUBLICATIONS

PCT International Search Report and Written Opinion dated Dec. 9, 2014, pp. 11, for Application PCT/EP2014/063179 filed Jun. 23, 2014.

(Continued)

*Primary Examiner* — Kwang B Yao
*Assistant Examiner* — Juvena Loo
(74) *Attorney, Agent, or Firm* — Rabindranath Dutta; Konrad Raynes Davda & Victor LLP

(57) ABSTRACT

Provided are a method, a system, and a computer program product in which a plurality of switches are maintained in a cascaded configuration. A switch relays a switch fabric internal link services (SW-ILS) to generate a pair of exchanges comprising a first exchange and a second exchange at the switch. In response to a termination of the first exchange of the pair of exchanges, the second exchange of the pair of exchanges is terminated.

18 Claims, 6 Drawing Sheets

(56) References Cited

U.S. PATENT DOCUMENTS

| | | | |
|---|---|---|---|
| 7,970,278 B2 | 6/2011 | Kinoshita et al. | |
| 8,160,096 B1* | 4/2012 | Anburaj | H04J 3/1605 370/255 |
| 2002/0018269 A1* | 2/2002 | Chaudhuri | H04J 14/0227 398/166 |
| 2003/0025959 A1* | 2/2003 | Nagarajan | H04L 49/602 398/45 |
| 2003/0137937 A1* | 7/2003 | Tsukishima et al. | 370/230 |
| 2004/0001487 A1 | 1/2004 | Tucker et al. | |
| 2004/0111605 A1 | 6/2004 | Weber | |
| 2009/0201804 A1* | 8/2009 | Johri et al. | 370/225 |
| 2011/0134925 A1 | 6/2011 | Safrai et al. | |
| 2012/0042077 A1* | 2/2012 | Ceccarelli et al. | 709/226 |
| 2012/0275787 A1* | 11/2012 | Xiong | H04L 49/357 398/45 |
| 2013/0070783 A1 | 3/2013 | Vermeulen et al. | |

FOREIGN PATENT DOCUMENTS

| | | | | |
|---|---|---|---|---|
| SE | 2466789 | * | 6/2012 | H04L 41/0654 |
| TW | 374634 | | 10/2012 | |
| TW | 378679 | | 12/2012 | |
| TW | 380642 | | 12/2012 | |

OTHER PUBLICATIONS

L. Berger et al., "Generalized Multi-Protocol Label Switching (GMPLS) Signaling Resource ReserVation Protocol-Traffic Engineering (RSVP-TE) Extensions", The Internet Society, Jan. 2003, Chapter 4.4.

S. Wilson, et al., "Fibre Channel Switch Fabric—6 (FC-SW-6) Rev 1.4", American National Standard for Information Technology, Nov. 26, 2013, retrieved from the Internet: URL:http://www.t11.org/ftp/t11/pub/fc/sw-6/13-047v0.pdf [retrieved on Nov. 26, 2014].

English abstract & machine translation of JP2002368770 published Dec. 20, 2002 by Hitachi Cable Ltd., Total 18 pp.

ITI, "Fibre Channel Switch Fabric—6 (FC-SW-6) Rev 1.2", Feb. 1, 2013, published by American National Standards Institute, 201x Information Technology Industry Council (ITI), Total 385 pp.

Taiwan Office Action dated Dec. 16, 2016, pp. 5, for Application 103118674 filed May 28, 2014.

Information Materials for IDS document dated Dec. 21, 2016, pp. 2, for Taiwan Office Action dated Dec. 16, 2016, pp. 5, for Application 103118674 filed May 28, 2014.

English translation of TWI374634 Oct. 11, 2012.
English translation of TWI378679 Dec. 1, 2012.
English translation of TWI380642 Dec. 21, 2012.

* cited by examiner

MECHANISM FOR TERMINATING RELAY OPERATIONS IN A DISTRIBUTED SWITCH WITH CASCADED CONFIGURATION

BACKGROUND

1. Field

Embodiments relate a mechanism for terminating relay operations in a distributed switch with cascaded configuration.

2. Background

Various components in computer systems, such as storage components, may be connected together using a Fibre Channel protocol, a gigabit speed data transfer technology used in a variety of settings including storage systems. Fibre Channel over Ethernet (FCoE) is a technology used for transporting Fiber Channel (FC) frames over Ethernet. FCoE standards for industry have been developed and distributed by the Technical Committee for Fiber Channel of the International Committee for Information Technology Standards (INCITS).

A proposed INCITS standard "FIBRE CHANNEL SWITCH FABRIC-6" (FC-SW-6) describes the requirements for an interconnecting Fabric comprising multiple Fabric Switch elements. Further details of FC-SW-6 may be found in the Internet based publication "http://www.t11.org/ftp/t11/pub/fc/sw-6/13-047v0.pdf" entitled "FIBRE CHANNEL SWITCH FABRIC-6," published Feb. 1, 2013, by the American National Standards Institute, 11 West 42nd Street, New York, N.Y. 10036. The version of FC-SW6 published on Feb. 1, 2013 is referred to as the "current FC-SW-6 proposed standard dated Feb. 1, 2013" for the purposes of this disclosure.

An FC Data-Plane Forwarder (FCDF) is a simplified FC switching entity that forwards FC frames among certain ports through a FCDF Switching Element. A distributed switch may comprise a set of FCDFs associated with at least one controlling switch, where the controlling switch controls the operations of the set of FCDFs. Certain distributed switches may be implemented in a ECoE or in a FC environment.

SUMMARY OF THE PREFERRED EMBODIMENTS

Provided are a method, a system, and a computer program product in which a plurality of switches are maintained in a cascaded configuration. A switch relays a switch fabric internal link services (SW-ILS) to generate a pair of exchanges comprising a first exchange and a second exchange at the switch. In response to a termination of the first exchange of the pair of exchanges, the second exchange of the pair of exchanges is terminated.

In additional embodiments, in response to a termination of the second exchange of the pair of exchanges, the first exchange of the pair of exchanges is terminated.

In yet additional embodiments, the first exchange or the second exchange is terminated by either receiving or sending an abort sequence (ABTS), wherein the plurality of switches includes a distributed Fibre Channel over Ethernet switch or a distributed Fibre Channel switch.

In further embodiments, terminating an exchange releases a pool of virtual resources corresponding to the exchange, in Fibre Channel over Ethernet or Fibre Channel.

In certain embodiments, the cascaded configuration comprises an originating switch, one or more intermediate switches, and a destination switch, wherein abort sequences are propagated both forward and backward in response to an error detected by at least one of the one or more intermediate switches.

In further embodiments, error detection is propagated in the cascaded configuration.

In yet further embodiments, all resources associated with an exchange relay are reclaimed in a timely manner.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Problems with Current Standard and Certain Embodiments

A distributed switch as defined by Chapter 17 of the current FC-SW-6 proposed standard dated Feb. 1, 2013 supports the concept of cascaded switching elements. The current FC-SW-6 proposed standard dated Feb. 1, 2013 does not provide a mechanism in which an error detected on one of the exchanges between two of the switches is recovered in a way that ensures that all of the resources involved in the exchange relay can be reclaimed in a timely manner.

Certain embodiments provide a mechanism for propagating error detection in a cascaded switch environment in a Fibre Channel or in a Fibre Channel over Ethernet environment. In a cascaded switch environment there is an originating switch at one end and a destination switch at the other end. In between the originating and the destination switch there are one or more intermediate switches. As a command makes its way from the originating switch to the destination switch, each intermediate switch relays the command until the command reaches the destination switch. If at any point, an error is detected on a command, it may be desirable to free up the resources associated with the command not just on the detecting switch, but on all of the switches in the chain. Certain embodiments provide a mechanism for freeing up resources in all switches in the chain, in the event of an error.

In certain embodiments, in response to a request, an intermediate switch tracks the association between an incoming exchange and an outgoing exchange. This can be used to ensure that if one of the exchanges needs to be aborted due to a timeout or other error, the other exchange are also aborted.

Certain embodiments are applicable to both Fibre Channel and Fibre Channel over Ethernet environments. For the purposes of the disclosure a distributed switch is a Distributed Fibre Channel switch or a Distributed Fibre Channel over Ethernet switch.

Exemplary Embodiments

Figure 1:
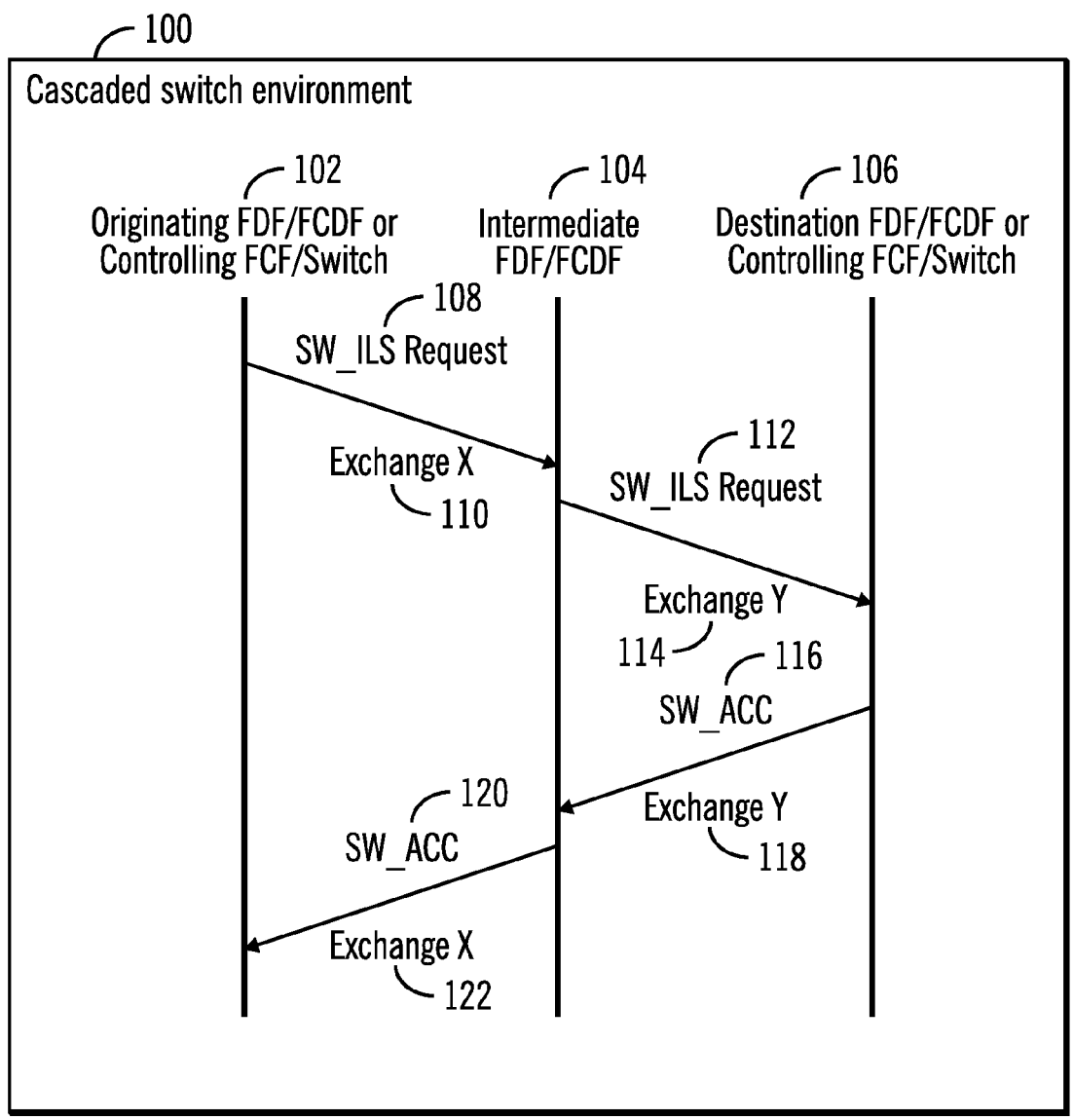
FIG. 1 illustrates a block diagram of a cascaded switch environment, in accordance with certain embodiments.

FIG. 1 illustrates a block diagram of a cascaded switch environment 100, in accordance with certain embodiments. FIG. 1 is the same as "FIG. 49" of the current FG-SW-6 proposed standard dated Feb. 1, 2013.

FIG. 1 shows an originating switch 102, and intermediate switch 104, and a destination switch 106 in a cascaded configuration. The originating switch 102, the intermediate switch 104, and the destination switch 106 may in certain embodiments be an FCDF, FDF or other type of switch as shown in FIG. 1, where FDF is for FCoE and is a FCoE data forwarder, and FCDF is for FC and is a FC Data-Plane Forwarder. The operations shown in FIG. 1 may be performed by various switches in the cascaded configuration of switches shown in FIG. 1, including the originating switch 102, the intermediate switch 104, and the destination switch 106. A switch is a device, including a computational or processing device, that can send, receive, and direct, data and commands.

In FIG. 1, the originating switch 102 sends an SW_ILS request 108 to the intermediate switch 104. SW_ILS refers to switch fabric internal link services. Associated with the SW_ILS request 108 are a virtual pool of resources referred to as Exchange X 110.

The intermediate switch 104 receives the SW_ILS request 108 and forwards a corresponding SW_ILS request 112 to the destination switch 106. Associated with the SW_ILS request 112 are a virtual pool of resources referred to as Exchange Y 114. Therefore, Exchange X 110 is associated with SW_ILS request 108 and Exchange Y 114 is associated with SW_ILS request 112.

Once the destination switch 106 receives the SW_ILS request 112, the destination switch 106 sends an SW_ACC 116 command to the intermediate switch 104, and the pool of virtual resources referred to as Exchange Y 118 are released. The SW_ACC 116 command is an acknowledgement that releases the pool of virtual resources. The intermediate switch 104 relays the SW_ACC 116 command to the originating switch 102 by sending a SW_ACC command 120 and the pool of resources denoted by Exchange X 122 is released.

Therefore, in FIG. 1 exchange identifiers (e.g., Exchange X, Exchange Y, etc.) are associated with SW_ILS requests, and such exchange identifiers that denote resources are released when corresponding SW_ACC commands are received.

The current FC-SW-6 proposed standard dated Feb. 1, 2013 does not provide a mechanism where an error detected on one of the exchanges between two of the switches is recovered in a way that ensures that all of the resources involved in the exchange relay can be reclaimed in a timely manner.

In FIG. 1, the relay of an SW_ILS results in a pair of related exchanges at the FCDF performing the relay. In certain embodiments proposed in this disclosure, when one of the pair of exchanges is terminated (e.g., by either receiving or sending ABTS, i.e., an abort sequence), the other related exchange is to be terminated via another ABTS. Abort sequences may relayed both backwards and forwards to release resources caused by an error in one of the switches in a cascaded switch environment. The error in a switch may be caused by a timeout or for some other reason.

Figure 2:
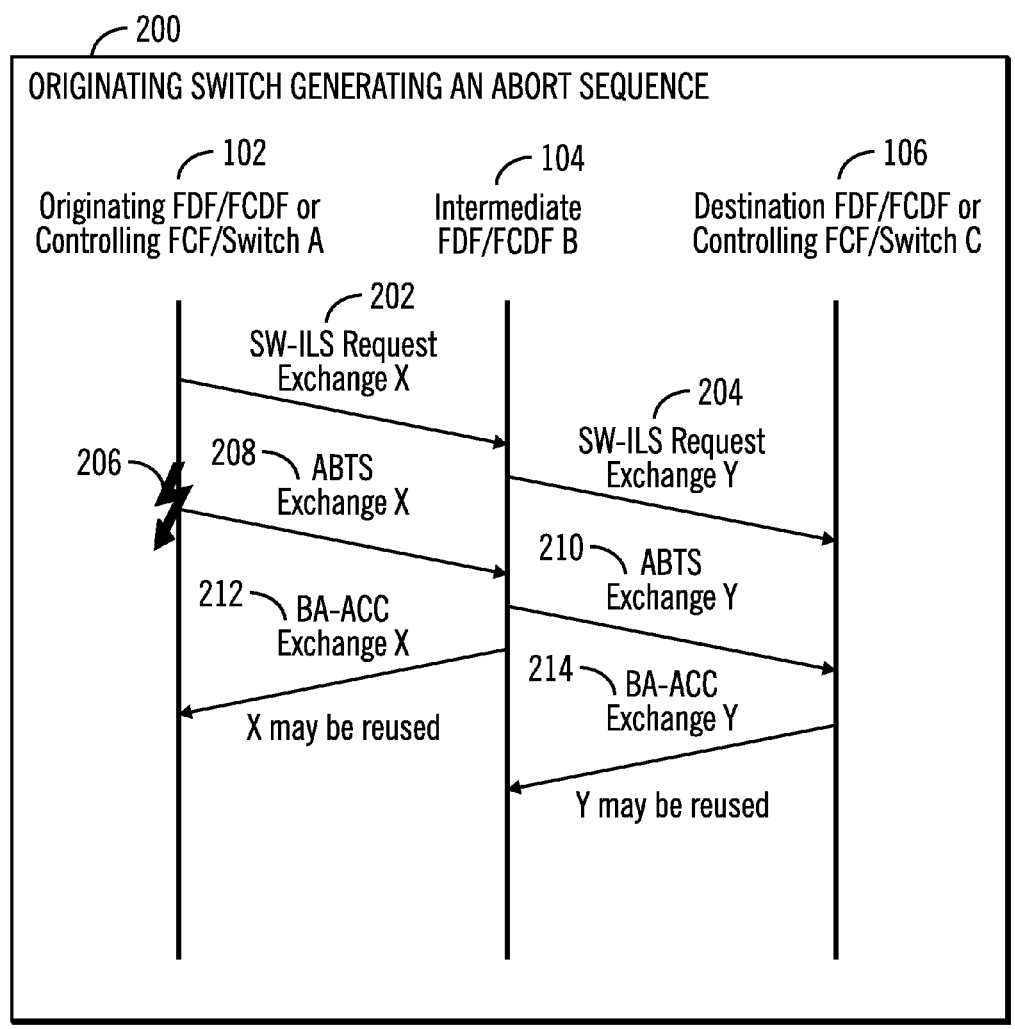
FIG. 2 illustrates a block diagram that shows an originating switch originating an Abort Sequence (ABTS), in accordance with certain embodiments.

FIG. 2 illustrates a block diagram 200 that shows an originating switch originating an ABTS, in accordance with certain embodiments. The operations shown in FIG. 2 may be performed by various switches in the cascaded configuration of switches shown in FIG. 2, including the originating switch 102, the intermediate switch 104, and the destination switch 106.

The originating switch 102 sends (reference numeral 202) a SW-ILS request that has associated resources denoted by Exchange X to the intermediate switch 104. The intermediate switch 104 forwards (reference numeral 204) the SW-ILS request that has associated resources denoted by Exchange Y to the destination switch 106. Then the originating switch 102 detects (reference numeral 206) an error.

On detecting the error, the originating switch 102 sends (reference numeral 208) an ABTS with which Exchange X is associated, to the intermediate switch 104. The intermediate switch 104 then sends in any order the ABTS with associated Exchange Y to the destination switch 106, and a BA-ACC with associated Exchange X to the originating switch 102 (reference numerals 210, 212). As a result of the BA-ACC with associated Exchange X, the pool of resources corresponding to Exchange X may be reused (reference numeral 212). In certain embodiments, the intermediate switch 104 may wait for the exchange Y to be terminated (wait for BA_ACC to ABTs on Exchange Y) before responding BA_ACC to Exchange X).

The destination switch 106, on receiving the ABTS from the intermediate switch 104, sends a BA-ACC with associated Exchange Y to the intermediate switch 104, and as a result the pool of resources corresponding to Exchange Y may be reused.

Therefore, in FIG. 2, the originating switch 102 has detected an error. The originating switch 102 sends an ABTS for Exchange X. When the intermediate switch 104 receives the ABTS, it deallocates the resources assigned to Exchange X and responds with a BA-ACC to the originating switch 102. In order to ensure that all resources are deallocated, the intermediate switch 104 also aborts Exchange Y with an ABTS to the destination switch 106.

Figure 3:
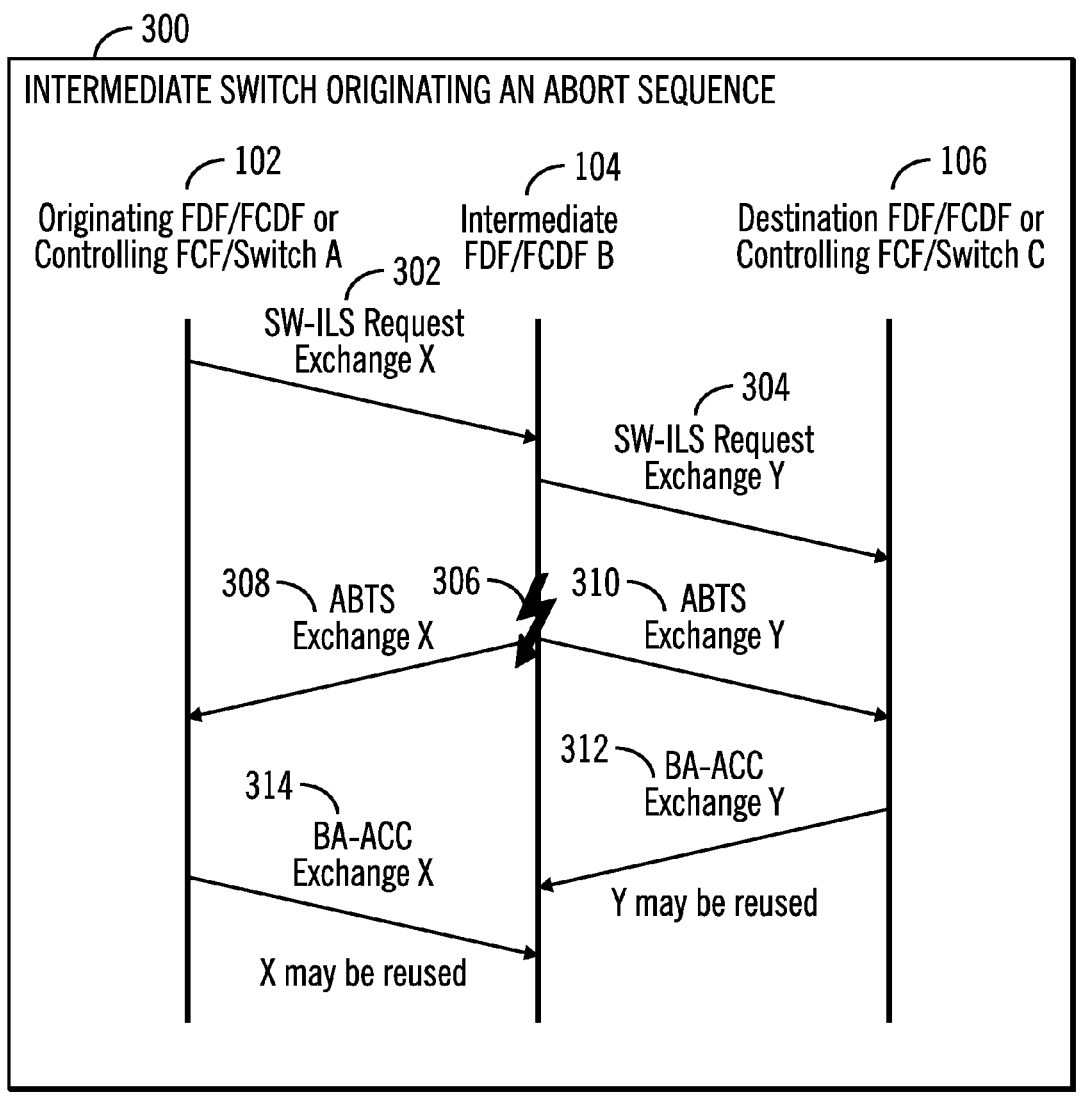
FIG. 3 illustrates a block diagram that shows an intermediate switch originating an ABTS, in accordance with certain embodiments.

FIG. 3 illustrates a block diagram 300 that shows an intermediate switch 104 originating an ABTS, in accordance with certain embodiments. The operations shown in FIG. 3 may be performed by various switches in the cascaded configuration of switches shown in FIG. 3, including the originating switch 102, the intermediate switch 104, and the destination switch 106.

In FIG. 3, the originating switch 102 sends a SW-ILS request with associated. Exchange X to the intermediate switch 104 (reference numeral 302), and the intermediate switch 104 after forwarding (reference numeral 304) the SW-ILS request with associated Exchange Y to the destination switch 106 detects (reference numeral 306) an error.

The intermediate switch 104 has detected the error in certain embodiments shown in FIG. 2. In order to free up all resources, ABTS is sent (reference numeral 310) from the intermediate switch 104 to the destination switch 106 for Exchange Y and ABTs is sent (reference numeral 312) from the intermediate switch 106 to the originating switch 102 for Exchange X. The resources associated with Exchange X and Exchange Y are released when the BA-ACC acknowledgements are received (reference numerals 312, 314) at the intermediate switch 104 from the originating switch 102 and the destination switch 106.

Figure 4:
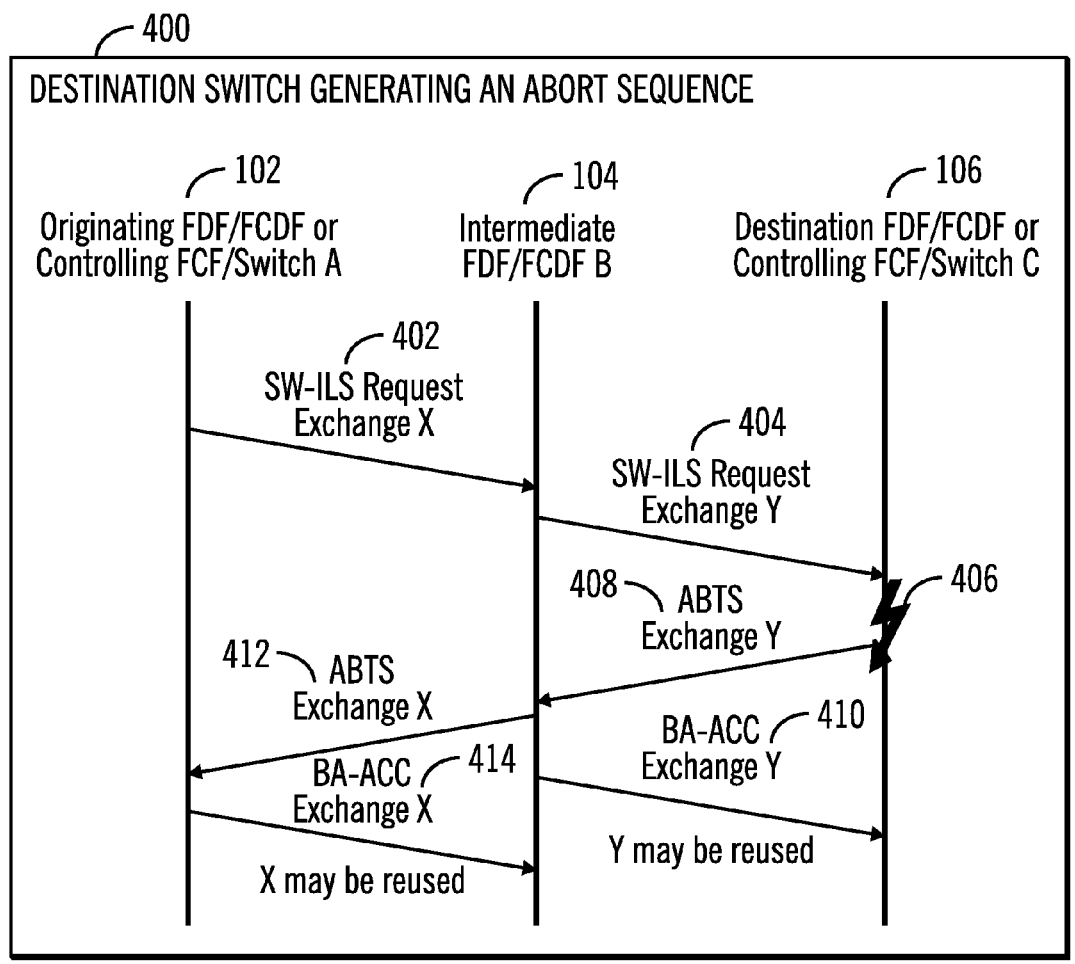
FIG. 4 illustrates a block diagram that shows a destination switch generating an ABTS, in accordance with certain embodiments.

FIG. 4 illustrates a block diagram 400 that shows a destination switch generating an ABTs, in accordance with certain embodiments. The operations shown in FIG. 4 may be performed by various switches in the cascaded configuration of switches shown in FIG. 4, including the originating switch 102, the intermediate switch 104, and the destination switch 106.

In FIG. 4, an SW_ILS request with associated Exchange X is sent (reference numeral 402) from the originating switch 102 to the intermediate switch 104, and then the intermediate switch 104 forwards (reference numeral 404) the SW-ILS request with associated Exchange Y to the destination switch 106.

The destination switch 106 then detects (reference numeral 406) an error, and sends (reference numeral 408) an ABTS with Exchange Y to the intermediate switch 104. The intermediate switch 104 sends (reference numeral 410) a BA-ACC with Exchange Y, such that the pool of virtual resources associated with Exchange Y may be reused. The intermediate switch 104 may also send (reference numeral 412) in parallel or before or after the operations shown via reference numeral 410, an ABTS with Exchange X to the originating switch 102 which sends (reference numeral 414) a BA-ACC with Exchange X to the intermediate switch 104 to release resources associated with Exchange X.

The destination switch 104 has detected the error in certain embodiments described in FIG. 4. In order to free up all resources, ABTS is sent to the intermediate switch 104 for Exchange Y and ABTS is relayed to the originating switch 102 for Exchange X.

Figure 5:
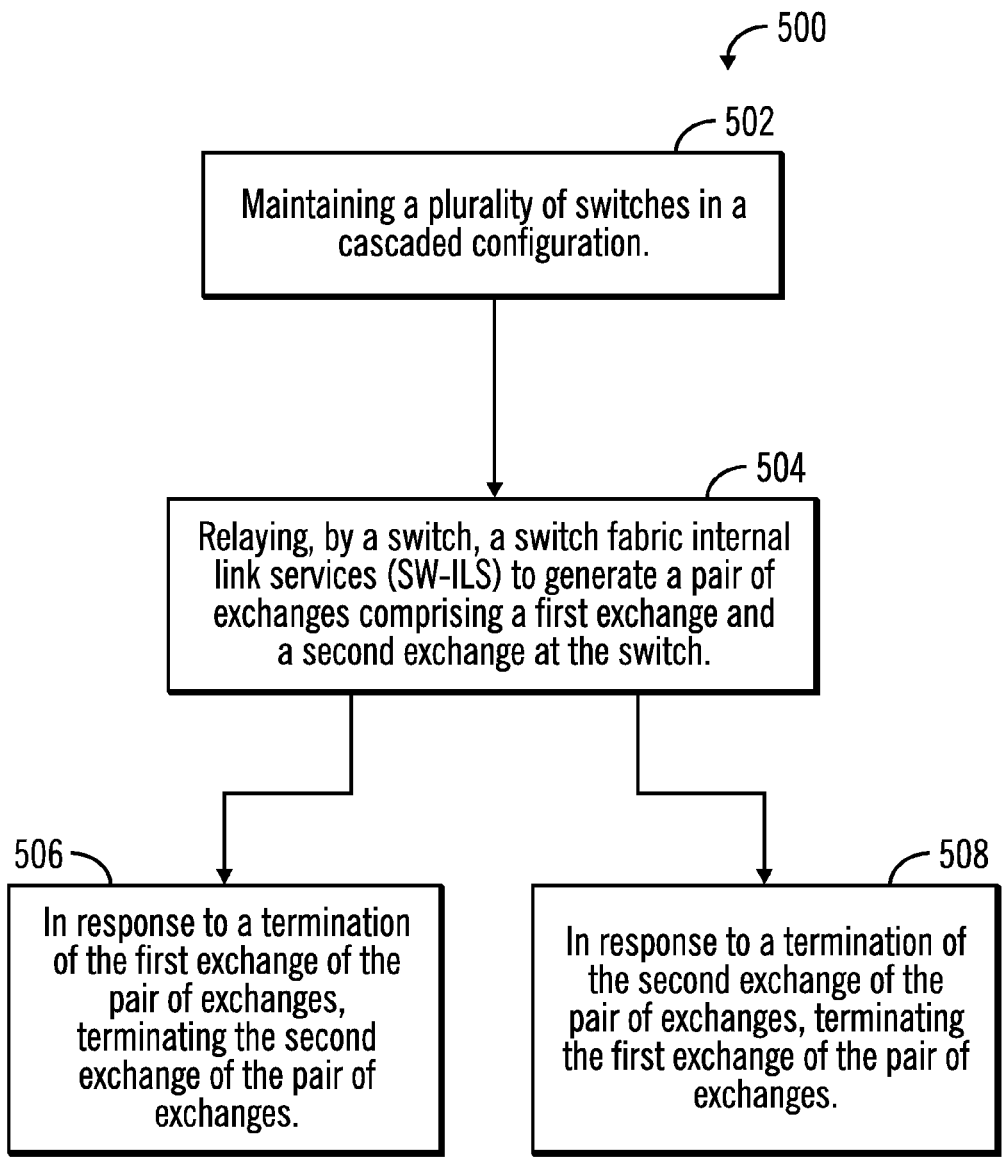
FIG. 5 illustrates a flowchart, in accordance with certain embodiments.

FIG. 5 illustrates a flowchart 500 in accordance with certain embodiments. The operations shown in FIG. 5 may be performed by one or more of the plurality of switches shown in FIGS. 1-4.

Control starts at block 502, in which a plurality of switches are maintained in a cascaded configuration. A switch relays (at block 504) a switch fabric internal link services (SW-ILS) to generate a pair of exchanges comprising a first exchange and a second exchange at the switch.

From block 504 control proceeds in parallel to block 506 and 508. At block 506, in response to a termination of the first exchange of the pair of exchanges, the second exchange of the pair of exchanges is terminated. In block 508, in response to a termination of the second exchange of the pair of exchanges, the first exchange of the pair of exchanges is terminated.

Therefore, FIGS. 1-5 illustrate certain embodiments in which a cascaded configuration comprises an originating switch, one or more intermediate switches, and a destination switch, where abort sequences are propagated both forward and backward in response to an error detected by at least one switch. In a Fibre Channel over Ethernet configuration or in a Fibre Channel configuration, all resources associated with an exchange relay are reclaimed in a timely manner.

In certain embodiments, a distributed switch may be implemented in a FC environment and may be referred to as a distributed FC switch. In other embodiments the distributed switch may be implemented in a FCoE environment and the distributed switch may be referred to as a distributed FCoE switch. Cascaded switch environments may be generated with distributed FC or FCoE switches, and embodiments that are similar may be implemented for FC and FCoE.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
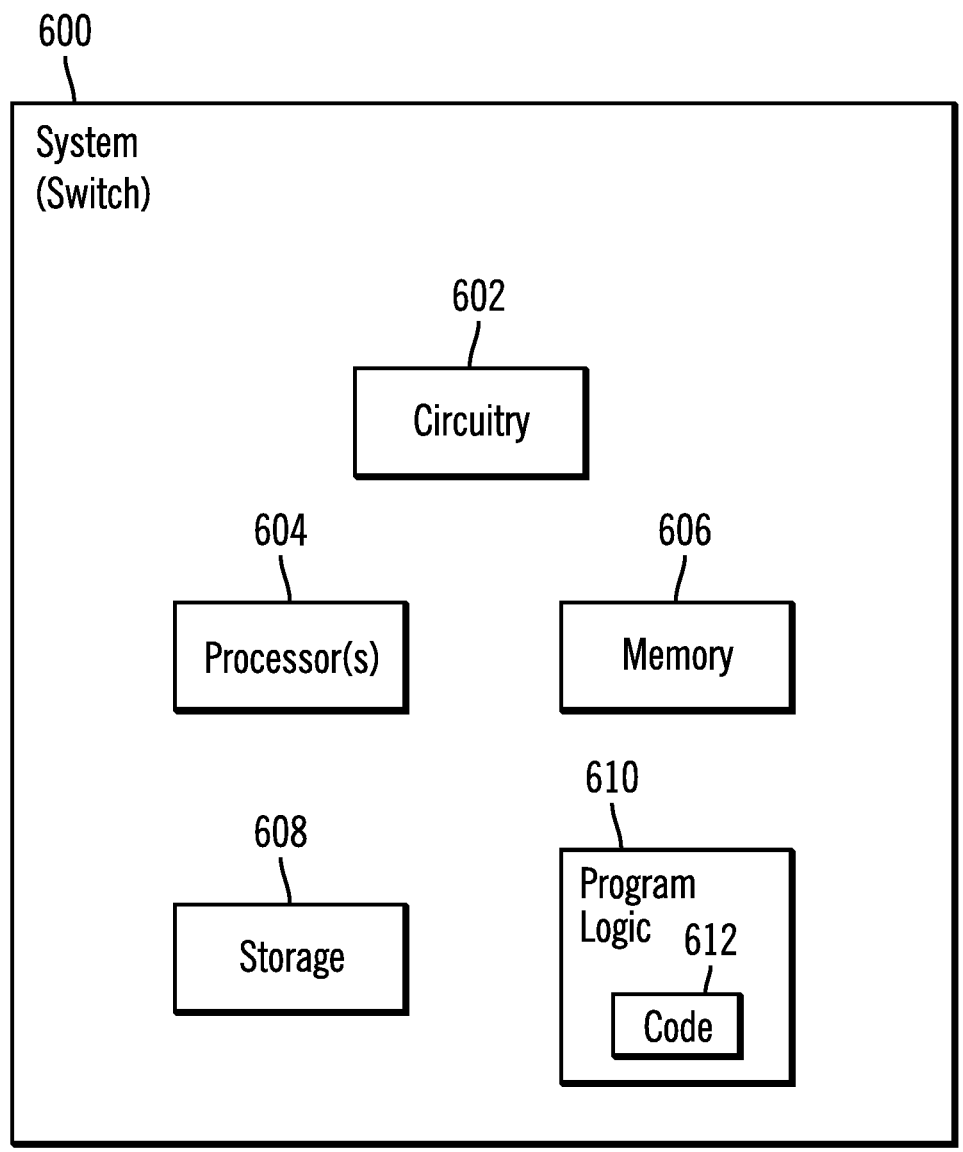
FIG. 6 illustrates a block diagram of a switch, in accordance with certain embodiments.

FIG. 6 illustrates a block diagram that shows certain elements that may be included in the switches 102, 104, 106 in accordance with certain embodiments. The system 600 may include a circuitry 602 that may in certain embodiments include at least a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or de circuitry 602.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components axe required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

maintaining a plurality of switches in a cascaded configuration, wherein the plurality of switches comprise an originating switch, an intermediate switch, and a destination switch;

sending, by the originating switch a switch fabric internal link services (SW-ILS) that has resources denoted by a first exchange to the intermediate switch;

forwarding, by the intermediate switch the SW-ILS request to the destination switch, where the SW-ILS request that is forwarded has resources denoted by a second exchange;

subsequent to the forwarding, detecting an error by the originating switch;

in response to the detecting of the error by the originating switch, sending an abort sequence (ABTS) with which the first exchange is associated, by the originating switch to the intermediate switch;

receiving at the intermediate switch the ABTS sent by the originating switch; and in response to receiving at the intermediate switch the ABTS sent by the originating switch, performing by the intermediate switch:

sending an acknowledgement associated with the first exchange to the originating switch to deallocate the resources denoted by the first exchange;

sending an ABTS with which the second exchange is associated to the destination switch;

in response to sending the ABTS with which the second exchange is associated to the destination switch, receiving an acknowledgement associated with the second exchange from the destination switch; and in response to receiving the acknowledgement associated with the second exchange from the destination switch, deallocating the resources denoted by the second exchange.

2. The method of claim 1, the method further comprising:
in response to a termination of the second exchange, terminating the first exchange.

3. The method of claim 2, wherein the plurality of switches includes a distributed Fibre Channel over Ethernet switch or a distributed Fibre Channel switch.

4. The method of claim 3, wherein terminating an exchange releases a pool of virtual resources corresponding to the exchange, in Fibre Channel over Ethernet or Fibre Channel.

5. The method of claim 1, wherein termination of the first exchange and the second exchange is also initiated by receiving at the intermediate switch another ABTS that is sent by the destination switch, in response a detection of another error by the destination switch.

6. The method of claim 1, wherein the acknowledgment associated with the first exchange that is sent to the originating switch and the acknowledgment associated with the second exchange that is received from the destination switch are via BA_ACC in Fibre Channel.

7. A system, comprising:

a plurality of switches maintained in a cascaded configuration, wherein the plurality of switches comprise an originating switch, an intermediate switch, and a destination switch;

a memory coupled to at least one of the plurality of switches; and a processor coupled to the memory, wherein the processor performs operations, the operations comprising:

sending, by the originating switch a switch fabric internal link services (SW-ILS) that has resources denoted by a first exchange to the intermediate switch;

forwarding, by the intermediate switch the SW-ILS request to the destination switch, where the SW-ILS request that is forwarded has resources denoted by a second exchange;

subsequent to the forwarding, detecting an error by the originating switch;

in response to the detecting of the error by the originating switch, sending an abort sequence (ABTS) with which the first exchange is associated, by the originating switch to the intermediate switch;

receiving at the intermediate switch the ABTS sent by the originating switch; and in response to receiving at the intermediate switch the ABTS sent by the originating switch, performing by the intermediate switch:

sending an acknowledgement associated with the first exchange to the originating switch to deallocate the resources denoted by the first exchange;

sending an ABTS with which the second exchange is associated to the destination switch;

in response to sending the ABTS with which the second exchange is associated to the destination switch, receiving an acknowledgement associated with the second exchange from the destination switch; and in response to receiving the acknowledgement associated with the second exchange from the destination switch, deallocating the resources denoted by the second exchange.

8. The system of claim 7, the operations further comprising:
in response to a termination of the second exchange, terminating the first exchange.

9. The system of claim 8, wherein the plurality of switches includes a distributed Fibre Channel over Ethernet switch or a distributed Fibre Channel switch.

10. The system of claim 9, wherein terminating an exchange releases a pool of virtual resources corresponding to the exchange, in Fibre Channel over Ethernet or Fibre Channel.

11. The system of claim 7, wherein termination of the first exchange and the second exchange is also initiated by receiving at the intermediate switch another ABTS that is sent by the destination switch, in response a detection of another error by the destination switch.

12. The system of claim 7, wherein the acknowledgment associated with the first exchange that is sent to the originating switch and the acknowledgment associated with the second exchange that is received from the destination switch are via BA_ACC in Fibre Channel.

13. A computer program product, the computer program product comprising:

a non-transitory computer readable storage medium having computer readable program code embodied therewith, the computer readable program code configured to perform operations on a processor, the operations comprising:

maintaining a plurality of switches in a cascaded configuration, wherein the plurality of switches comprise an originating switch, an intermediate switch, and a destination switch;

sending, by the originating switch a switch fabric internal link services (SW-ILS) that has resources denoted by a first exchange to the intermediate switch;

forwarding, by the intermediate switch the SW-ILS request to the destination switch, where the SW-ILS request that is forwarded has resources denoted by a second exchange;

subsequent to the forwarding, detecting an error by the originating switch;

in response to the detecting of the error by the originating switch, sending an abort sequence (ABTS) with which the first exchange is associated, by the originating switch to the intermediate switch;

receiving at the intermediate switch the ABTS sent by the originating switch; and in response to receiving at the intermediate switch the ABTS sent by the originating switch, performing by the intermediate switch:

sending an acknowledgement associated with the first exchange to the originating switch to deallocate the resources denoted by the first exchange;

sending an ABTS with which the second exchange is associated to the destination switch;

in response to sending the ABTS with which the second exchange is associated to the destination switch, receiving an acknowledgement associated with the second exchange from the destination switch; and in response to receiving the acknowledgement associated with the second exchange from the destination switch, deallocating the resources denoted by the second exchange.

14. The computer program product of claim 13, the operations further comprising:

in response to a termination of the second exchange, terminating the first exchange.

15. The computer program product of claim 14, wherein the plurality of switches includes a distributed Fibre Channel over Ethernet switch or a distributed Fibre Channel switch.

16. The computer program product of claim 15, wherein terminating an exchange releases a pool of virtual resources corresponding to the exchange, in Fibre Channel over Ethernet or Fibre Channel.

17. The computer program product of claim 13, wherein termination of the first exchange and the second exchange is also initiated by receiving at the intermediate switch another ABTS that is sent by the destination switch, in response a detection of another error by the destination switch.

18. The computer program product of claim 13, wherein the acknowledgment associated with the first exchange that is sent to the originating switch and the acknowledgment associated with the second exchange that is received from the destination switch are via BA_ACC in Fibre Channel.

* * * * *